(No Model.)
N. L. KINNEY.
MACHINE FOR SPRINKLING POTATO VINES.
No. 330,130. Patented Nov. 10, 1885.
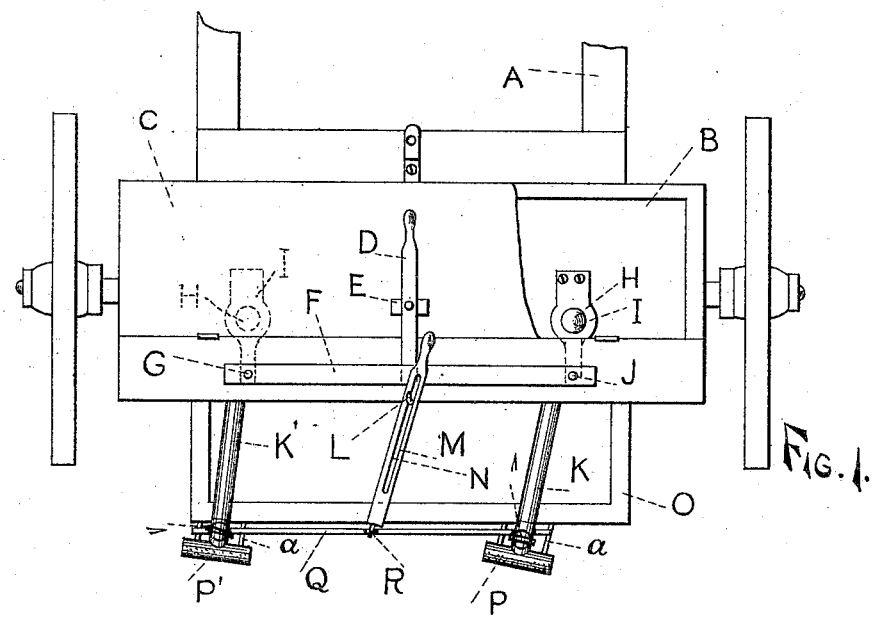
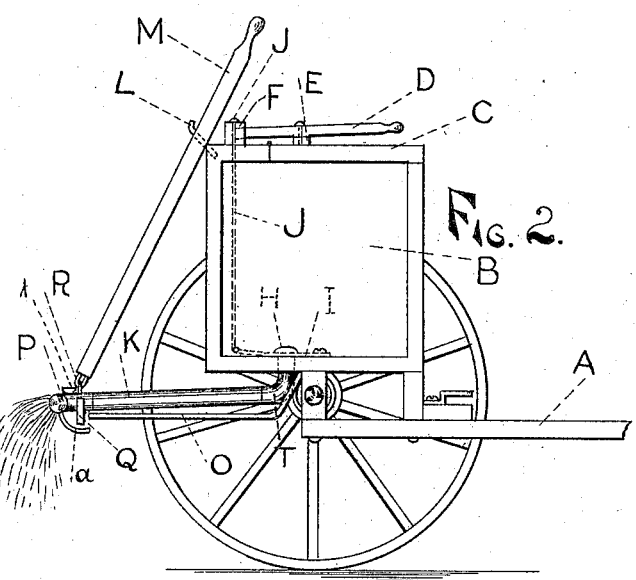
WITNESSES:
Jay D. Naysmith
Frank S. Donaldson
INVENTOR
Norman L. Kinney
BY Dennis L. Rogers
ATTORNEY

UNITED STATES PATENT OFFICE.

NORMAN L. KINNEY, OF BARFORD, QUEBEC, CANADA, ASSIGNOR TO LYMAN T. KINNEY, OF GRAND RAPIDS, MICHIGAN.

MACHINE FOR SPRINKLING POTATO-VINES.

SPECIFICATION forming part of Letters Patent No. 330,130, dated November 10, 1885.

Application filed June 23, 1884. Renewed July 24, 1885. Serial No. 172,583. (No model.) Patented in Canada October 10, 1883, No. 17,856.

*To all whom it may concern:*

Be it known that I, NORMAN L. KINNEY, a citizen of the Dominion of Canada, and residing at Barford, in the county of Stanstead and Province of Quebec, Canada, have invented a new and useful improvement in machines for sprinkling potato vines or other plants with paris-green in solution, or other liquids, for the purpose of destroying potato bugs or other insects, (for which I have obtained a patent in Canada, No. 17,856, and bearing date October 10, 1883,) of which the following is a specification, reference being had to the accompanying drawings.

My invention relates to the construction of a suitable receptacle to contain a liquid, mounted upon wheels and provided with suitable valves for drawing off the liquid, and with tubes and sprinkling attachments for distributing the liquid evenly upon the plants without waste.

Referring to the drawings, Figure 1 is a plan view with a portion of the lid C removed; Fig. 2, end elevation with wheel removed.

B represents the reservoir, which may be divided into two chambers by a suitable partition, if desired, is mounted upon wheels by being secured upon the top of an axle to which the thills A are secured, and is suitably attached in any convenient manner, preferably as shown in Fig. 2, and is provided with a hinged lid or cover, C, which forms the seat of the driver when the machine is operated. About equidistant from either end, at suitable distances apart in the bottom, are openings I I, having spring covers or valves H H, to which are attached rods J and G, the upper ends of which are attached to the connecting-bar F, which is raised and lowered by means of hand-lever D, secured to the lid at the fulcrum E. By pressing the lever D the valves H H are opened, and when the pressure is removed they will remain closed. Secured to the bottom of B, and communicating with holes I, are the elbows T. (Shown only in Fig. 2.) To these elbows are attached flexible hose K K', preferably of rubber, and at the end of hose K are attached sprinklers P P'. These sprinklers rest upon, without being attached to, the frame O, which is secured rigidly to the axle, are kept in position by means of guide-rod Q, upon which they are placed, and to which they are detachably connected by means of hooks *a a*. Guide-rod Q is moved laterally upon frame O by means of hand-lever M, having slot N, through which passes the pin L, rigidly secured to the corner of reservoir B. Lever M is attached to rod Q by means of staple-joint R.

1 1 are cocks placed in the T part of sprinklers P P', for regulating the flow of the liquid according to the quantity desired to be used.

Having thus described my invention, what I claim as new, and desire to secure by Letters Patent of the United States, is—

In a machine for sprinkling plants with liquids, the combination of a reservoir, B, having openings I I, valves H H, rods J and G, connecting-bar F, lever D, elbows T, hose K K', sprinklers P P', having hooks *a a* and cocks 1 1, and frame O, with connecting-bar Q, having slotted lever M, attached to reservoir B by pin L, substantially as described.

NORMAN L. KINNEY.

Witnesses:
L. S. PONT,
NORMAN MORRISON.